S. C. ROBERTS.
APPARATUS FOR PRODUCING ANIMAL FODDER.
APPLICATION FILED NOV. 4, 1914.
1,247,153.
Patented Nov. 20, 1917.
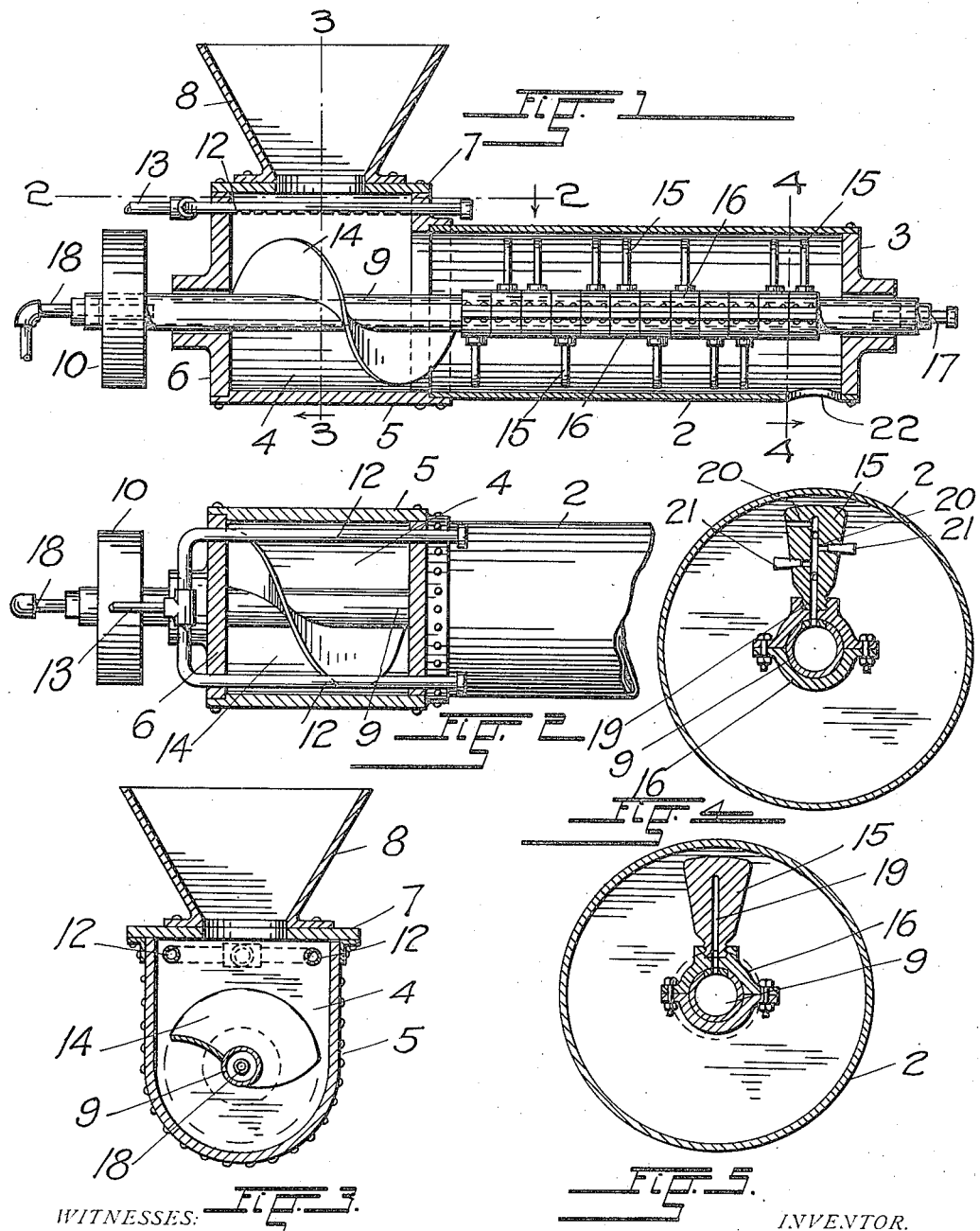
WITNESSES:
INVENTOR.
S. C. Roberts.
BY
ATTORNEY.

UNITED STATES PATENT OFFICE.

SHERMAN C. ROBERTS, OF DENVER, COLORADO.

APPARATUS FOR PRODUCING ANIMAL-FODDER.

1,247,153.  Specification of Letters Patent.  Patented Nov. 20, 1917.

Application filed November 4, 1914. Serial No. 870,197.

*To all whom it may concern:*

Be it known that I, SHERMAN C. ROBERTS, a citizen of the United States, residing at Denver, in the county of Denver and State of Colorado, have invented certain new and useful Improvements in Apparatus for Producing Animal-Fodder, of which the following is a specification.

This invention relates to improvements in apparatus for producing animal fodder.

By mixing a mealed forage, preferably composed of alfalfa and a cereal such as corn, barley or oats, with a syrup for the purpose of providing a fodder which has the proper quantities of carbo-hydrates and protein required in an article of this character.

The principal object of the present invention is to provide a fodder of superior quality and one that will properly withstand the deteriorative effects of climatic conditions in the tropics or in summer-time, by subjecting its ingredients while they are being mixed, to the influence of artificial heat to any desired degree either below or above the boiling point.

While within the spirit of my invention, the heat may be applied to the mixture in any suitable manner, I preferably obtain this object by introducing steam into the hollowed parts of the mixing apparatus when it is desired to merely heat the fodder, or to admit the steam directly into the mixture through apertures in the said parts when it is required to bring the liquid constituents thereof to the boiling point.

An embodiment of my invention has been illustrated in the accompanying drawings in the various views of which like parts are similarly designated, and in which, Figure 1 represents a longitudinal section through the mixing machine, Fig. 2, a horizontal section along the line 2—2, Fig. 1, Fig. 3, a transverse section taken along the line 3—3, Fig. 1.

Fig. 4, a transverse section along the line 4—4 Fig. 1, drawn to an enlarged scale, and Fig. 5, a similar section showing the method of introducing steam into the material under treatment, for the purpose hereinbefore described.

Referring to the drawings in detail, the reference character 2 designates a horizontally disposed, cylindrical mixing trough which at one of its ends is closed by means of a head 3, and which at its opposite end is connected with a feed chamber 4 formed in a trough 5 which at its outer end is closed by a head 6 and which at its upper edges is covered by an apertured plate 7 which supports a hopper 8 through which the meal is introduced into the machine.

The two heads 3 and 6 are formed with axially alined bearings for the support of a shaft 9 which at a point outside the feed-trough is provided with a pulley 10 for its operative connection with a conveniently located motor.

A pair of perforated pipes 12 disposed in the upper portion of the feed-trough, serve to introduce the syrup thereinto, the said pipes being at a point outside the said trough connected with a conduit 13 which communicates with a source of supply.

The portion of the shaft within the feed chamber carries a spiral screw blade 14 which serves to convey the meal and syrup introduced into the said chamber, into the cylindrical mixing trough 2 in which the two ingredients are mixed by the action of a plurality of paddles 15 which extend radially from the shaft to which they are separately attached by means of the split collars 16 shown in Figs. 3 and 4.

The shaft 9 is tubular and its axial bore is closed at one of its ends by means of a detachable plug 17 while at its opposite end it connects with the stationary steam-discharge-pipe 18 of a conveniently located boiler.

The paddles and the collars on which they are mounted are provided with alined steam-ducts 19 which register with apertures in the shaft and are thereby placed in communication with the interior of the same.

The ducts of the paddles are by means of transverse passages 20, connected with apertures in the exterior surfaces thereof for the introduction of steam into the mixing trough when it is desired to boil its liquid contents, but when it is required to only heat the mixture contained in the mixing trough, these passages may be omitted as shown in Fig. 5, or they can be closed by the use of removable plugs 21, as is indicated in Fig. 4.

The mixing machine is in practice mounted upon a suitable support which has been omitted in the drawings, and the cylindrical mixing trough has at its end remote from the feed chamber, an opening 22 in its bottom portion for the discharge of the product of the machine into a subjacently disposed receptacle.

In the operation of the machine the meal and syrup are introduced into the feed chamber respectively through the hopper 8 and through the perforations in the pipes 12; the two ingredients are by means of the spiral blade on the constantly rotating shaft, conveyed into the cylinder in which they are thoroughly and intimately mixed by the action of the paddles.

While thus being agitated the mixture is subjected to artificial heat by contact with the parts of the rotary element which are filled with the steam supplied through the conduit 18, or when it is necessary to boil the contents of the machine while being mixed, the steam is introduced thereinto through the passages in the paddles, as hereinabove described.

The product of the machine is discharged through the opening 22 in the end of the cylinder and by removing the plug 17 in the end of the shaft, the steam may be exhausted from the latter either into the open, or into the water space of the boiler, by means of a suitably connected pipe.

It will be observed that by the movement of the paddles in close proximity to the interior surface of the cylindrical mixing trough, the material while being mixed is kept of a uniform fineness and cannot form into lumps as is the case in many of the machines at present in use, and the provision of the screw conveyer in the feed chamber prevents clogging of the feed opening by an accumulation of material and thus increases the capacity of the machine.

Having thus described my invention what I claim and desire to secure by Letters-Patent is:

1. Apparatus for the production of fodder of the character described comprising a vat, a feed-chamber connected therewith and having an opening for the admission of meal, means for feeding a syrup into said chamber, a rotary shaft, a feed-screw on said shaft within said feed-chamber, and non-conveying agitating paddles on the shaft within said vat, said paddles being positioned separate from and successive to said feed-screw.

2. Apparatus for the production of fodder of the character described comprising a vat, a feed-chamber connected therewith, and having an opening for the admission of meal, means for feeding a syrup into said chamber, a rotary shaft, a feed-screw on said shaft within said feed-chamber, non-conveying agitating paddles on the shaft within said vat, said paddles being positioned separate from and successive to said feed-screw, and means for introducing steam into the vat during the mixing-action.

3. Apparatus for the production of fodder of the character described comprising a vat, a feed-chamber connected therewith, and having an opening for the admission of meal, means for feeding a syrup into said chamber, a rotary shaft, a feed-screw on said shaft within said feed-chamber, non-conveying agitating paddles on the shaft within said vat, said paddles being positioned separate from and successive to said feed-screw, said shaft and said paddles having communicating passages and apertures for the introduction of steam into the vat during the mixing action.

In testimony whereof I have affixed my signature in presence of two witnesses.

SHERMAN C. ROBERTS.

Witnesses:
G. J. ROLLANDET,
L. L. RHOADES.